(12) United States Patent
Yearworth et al.

(10) Patent No.: US 8,814,450 B2
(45) Date of Patent: *Aug. 26, 2014

(54) KEYING CONSUMABLES TO SPECIFIC DEVICES

(75) Inventors: Michael Yearworth, Bristol (GB); Michal Morciniec, Torrelodones (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/277,119

(22) Filed: Oct. 19, 2011

(65) Prior Publication Data

US 2012/0044286 A1 Feb. 23, 2012

Related U.S. Application Data

(63) Continuation of application No. 11/411,042, filed on Apr. 26, 2006, now Pat. No. 8,042,894.

(30) Foreign Application Priority Data

Apr. 27, 2005 (GB) .................................. 0508470.2

(51) Int. Cl.
*B41J 5/30* (2006.01)
(52) U.S. Cl.
USPC ................................ 400/62; 702/85; 705/35

(58) Field of Classification Search
USPC ......... 347/5, 9, 35, 85, 86, 6; 400/62; 705/35; 702/85
See application file for complete search history.

(56) References Cited

U.S. PATENT DOCUMENTS

| 2002/0188413 | A1 | 12/2002 | Borg |
| 2003/0112457 | A1 | 6/2003 | Akiyama et al. |
| 2005/0216358 | A1 | 9/2005 | Fichtner et al. |
| 2006/0045595 | A1 | 3/2006 | Hanaoka |

FOREIGN PATENT DOCUMENTS

| WO | 03/019459 A2 | 3/2003 |
| WO | 2004/058503 A2 | 7/2004 |

*Primary Examiner* — Lam S Nguyen

(57) ABSTRACT

An apparatus is provided that uses a consumable item, of given type, requiring occasional renewal. The apparatus has a first operating mode in which it only works with a subset of consumable items of the given type; the apparatus also has a second operating mode in which it is not restricted to working with consumable items of the aforesaid subset. The apparatus is changed from its first mode to its second mode following a determination that the apparatus has reached a predetermined time or usage threshold for being in its first mode. The change to the second mode is preferably effected in response to a release code generated either by the apparatus itself or by a remote system following the determination that the predetermined time or usage threshold being reached. Advantageously, the consumable items can be used to pass usage data to a remote system.

19 Claims, 4 Drawing Sheets

KEYING CONSUMABLES TO SPECIFIC DEVICES

RELATED APPLICATION

The present application is a continuation of U.S. patent application Ser. No. 11/411,042, filed Apr. 26, 2006 now U.S. Pat. No. 8,042,894, which claims priority from UK Patent Application Number 0508470.2, filed Apr. 27, 2005, both of which are hereby incorporated by reference herein in their entirety.

FIELD OF THE INVENTION

The present invention relates to an apparatus that uses consumable items and to a method of managing such an apparatus. The apparatus is, for example, a printer with the consumable items being ink or toner cartridges; however, it is to be understood that the present invention is applicable to any type of apparatus that that uses a consumable item, of given type, requiring occasional renewal (for example, a motor vehicle with renewable parts).

BACKGROUND OF THE INVENTION

It is known (for example from US 2004/0172532) to provide a consumable item, such as a ink cartridge, with an integrated circuit chip enabling it to be authenticated by an apparatus, such as a printer. The chip stores a private key of a public/private key pair, and includes functionality for responding to a challenge issued by the apparatus by encrypting an element included in the challenge using the stored private key, and returning the encrypted element to the challenging apparatus. The apparatus decrypts the returned encrypted element using the public key associated with an authentic consumable item and only if the result of this decryption matches the original element included in the challenge does the apparatus accept the consumable item as a genuine one.

Using such an arrangement, it is possible to ensure that only genuine consumable items are used with an apparatus. This has advantages for a manufacturer providing warranty services because the manufacturer can be certain that any defects arising in the apparatus are not as a result of consumable items of doubtful provenance and quality having been used for the apparatus. However, a user of the apparatus may feel aggrieved that his/her freedom to use consumable items from any source has been removed.

There are other situations where different parties have different interests in relation to controlling the source of consumable items to be used in an apparatus. For example, a user may opt to obtain possession of a printer through a lease-purchase arrangement by which legal title to the apparatus only passes to the user after a predetermined lease period. During the lease period the lessor will wish to ensure that the consumable items used are not harming the apparatus which the lessor still owns; however, the user will always wish to have a free choice of the source from which he/she obtains consumable items for the apparatus as this ensures that the price is kept reasonable through operation of market forces.

It is an object of the present invention to provide increased flexibility in the management of an apparatus using a consumable item, of given type, requiring occasional renewal.

SUMMARY OF THE INVENTION

According to one aspect of the present invention, there is provided a method of managing an apparatus that uses a consumable item, of given type, requiring occasional renewal; the method comprising:
  setting the apparatus to operate in a first mode in which it only works with a subset of consumable items of said given type; and
  determining when the apparatus has reached a predetermined time or usage threshold for being in its first mode, and thereupon causing the apparatus to be set to operate in a second mode in which the apparatus is not restricted to working with consumable items of said subset.

The determination of when the predetermined time or usage threshold of the apparatus has been reached can be effected by the apparatus itself or by a remote system; in the latter case, the determination can advantageously be based on usage data passed to the remote system in a returned consumable item.

In certain preferred embodiments the setting of the apparatus into its second mode is brought about by a release code provided by a remote system via a replacement consumable item. This arrangement is particularly advantageous where the apparatus is monitoring usage and providing usage data back to the remote system as it ensures that all usage data concerning operation of the apparatus in its first mode up to the predetermined time or usage threshold, is returned to the remote system.

According to another aspect of the present invention, there is provided an apparatus comprising:
  an interface for receiving a consumable item of given type; and
  a control arrangement for controlling apparatus operation and comprising:
    a check arrangement for checking whether a consumable item received by the interface is of a particular subset of consumable items of the given type; and
    a mode control unit arranged to respond to a release code to change the apparatus operation from a first mode in which the apparatus only works with consumable items that the check arrangement has found to be of the particular subset, to a second mode in which the apparatus is not restricted to working with consumable items of the particular subset.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

The following description of embodiments of the invention is given with respect to an apparatus in the form of a printer which uses consumable items in the form of ink cartridges of a given type (that is, of a type adapted for use with the printer concerned). However, it is to be understood that the present invention is not limited to printers and ink cartridges and can be applied to printers using toner cartridges and, more generally, to any apparatus using consumable items requiring occasional renewal (including apparatuses such as motor vehicles).

Figure 1:
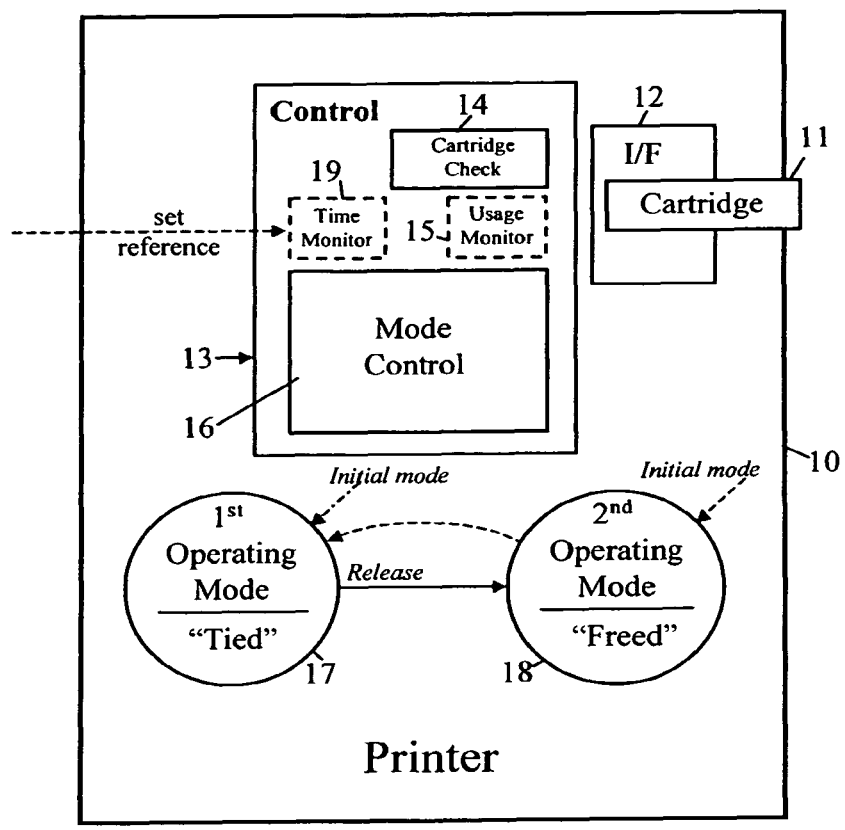
FIG. 1 is a diagram of the general form of a printer apparatus embodying the invention.

FIG. 1 depicts the general form of a printer 10 embodying the invention. The printer 10 comprises an interface 12 physically and electrically adapted to receive a replaceable ink cartridge 11 in a manner well known in the art. The printer 10 further comprises a control block 13 for controlling the operation of the printer 10 including the operation of the mechanisms (not shown) for moving a print head relative to a print medium such as a paper sheet; the print head may be integrally formed with the ink cartridge 11 as is generally the case with desktop thermal inkjet printers.

The control block 13 includes a cartridge check unit 14 for checking whether the cartridge installed in the interface 12 belongs to a particular subset of cartridges adapted to fit the printer; this subset can, for example, be that formed by cartridges from a particular manufacturer or supplied by a particular party. For convenience, this subset is referred to below as the "approved subset" and cartridges that are members of this subset are referred to as "approved cartridges".

The control block 13 is arranged to provide for operation of the apparatus in a currently set one of two operating modes. In a first one of these two operating modes, hereinafter referred to as the "tied" mode 17, the apparatus 10 will only work with an ink cartridge 11 that the cartridge check unit 14 has confirmed is a member of the aforesaid approved subset; in a second one of the two operating modes, hereinafter referred to as the "freed" mode 18, the apparatus 10 is not restricted to working with an ink cartridge 11 from the approved subset. It is the control block 13 which implements the requirements of these two operating modes.

The control block 13 further includes a mode control unit 16 for causing the operating mode of the apparatus to change at least from its tied mode 17 to its freed mode 18 in response to a release code generated under predetermined conditions to be explained below. The apparatus 10 can be arranged to be initially set at manufacture into its tied mode 17 and only be required to transition once into the freed mode 18—in this case the mode control unit 16 is not required to provide for transitioning the apparatus from its freed mode 18 to its tied mode 17. In other cases, the mode control unit 16 may be required to provide for transition from the freed mode 18 to the tied mode 17 as would the case where the apparatus was initially set at the time of manufacture into its freed mode 18.

The control block 13 can also include a usage monitor 15 for monitoring usage of the apparatus in its tied mode 17 and, in certain embodiments, for determining when a predetermined threshold usage has been reached. Usage can be monitored based on the amount of ink used, the number of ink cartridges 11 used, or on a count of particular operations of the apparatus (such as pages printed) without regard to any related consumption of the ink/ink cartridges.

The control block 13 can further include a time monitor 19 for providing a reliable measure of elapsed time from a reference time (typically a particular date) to determine when a threshold time has been reached (this threshold time either being specified as a particular date or as a duration from the reference time). The time monitor 19 can use externally-provided time signals to ensure a reliable measure of the passage of time, the signals being provided, for example, either via a network or by direct radio transmission from a time reference source.

With regard to how the threshold usage is set for the usage monitor 15 and/or how the reference time and threshold time are set for the time monitor 19 are set, this can be done by operation of user controls of the printer or by an input via a data interface. Unauthorised resetting of the threshold usage and/or reference and threshold times can be prevented by any suitable measures such as making the setting of these quantities one-off operations or by requiring the input of a secret before the values of these quantities are accepted.

The FIG. 1 apparatus is a generalised depiction of a printer embodying the present invention and elements such as the usage monitor 15 and the time monitor 19 are not required in all specific implementations based on the FIG. 1 form.

The control block 13 will typically be implemented as a program controlled processor though other implementations, such as in the form of dedicated circuitry, are also possible. Preferably, the control block is based on trusted platform technology whereby to minimise the risk of the functionality provided by the control block 13 being modified in an unauthorised manner.

Before describing specific implementations and methods of managing the printer 10, certain options will be outlined for generating the release code that causes the mode control unit 16 to set the apparatus into its freed mode 18; options will also be outlined for how the cartridge check unit checks whether an ink cartridge installed in the interface 12 is a member of the approved subset of cartridges.

Regarding generation of the release code, this is generated in response to the apparatus reaching a predetermined time or usage threshold for the apparatus being in its first mode, the reference point for measuring the time or usage of the apparatus in its first mode being typically when a particular party takes possession of, or responsibility for, the apparatus (the apparatus being in its first mode at this point). Particular implementation options include:

(a) The apparatus itself determines when the predetermined time or usage threshold has been reached (by using the time monitor 19 or usage monitor 15 as appropriate), the release code being provided to the mode control unit 16 when the threshold is reached.

(b) The apparatus determines when the predetermined time or usage threshold has been reached (by using the time monitor 19 or usage monitor 15 as appropriate); a release indication is then stored by the control block 13 into a storage element (such as an integrated circuit) integral with the currently-installed ink cartridge 11. In due course, the spent ink cartridge 11 is returned to a remote system (such as that of a lessor of the apparatus) which reads the release indication and writes the release code to the same or another ink cartridge 11. The user then installs the cartridge holding the release code in the apparatus 10 where the code is read, via the interface 12 by the mode control unit 16 causing it to set the apparatus into its freed mode 18.

(c) The determination of when the predetermined time or usage threshold has been reached is carried out by a remote system without data input from the apparatus 10; where a usage threshold is being used, usage is based on the return of ink cartridges 11, the extent of usage being either a count of cartridges used or the amount of ink used having regard to the amount of ink remaining in the returned ink cartridges 11. When the predetermined threshold is reached, the remote system writes the release code to an ink cartridge 11; thereafter matters proceed as in (b) above.

(d) The apparatus uses the usage monitor 15 to measure the usage of the apparatus in its first mode and the usage monitor writes corresponding usage data into the cartridge currently installed in the interface 12. The usage data can reflect usage since the last time an ink cartridge was written or, preferably, cumulative usage. The ink cartridge 11 is in due course returned to a remote system (such as that of a lessor of the apparatus) which reads the usage data and uses it (and possibly also usage data collected from cartridges previously returned in respect of the same apparatus) to determine whether the predetermined usage threshold has been reached; if so, the remote system writes the release code to the same or another ink cartridge 11 and matters proceed as in (b) above.

It will be appreciated that the release code can be of any suitable form (including a multi-part format) and that this form may change in passage from its point of generation to the mode control unit 16. Where a remote system is used to generate the release code, this can be provided back to the apparatus by means other than an ink cartridge 11; for example a network message could be used if the printer was network connected. The release code may be encrypted when passing over an insecure path from the remote system to the printer. Preferably, this encryption is done by the remote system using a public key of the printer, the printer storing a corresponding private key which it uses to decrypt the encrypted release code; in this manner, the encrypted release code is only of use to the printer holding the private key matching the public key with which the code was encrypted.

For the implementations (b) and (d) where a release indication or usage data is passed from the printer to a remote system in a returned ink cartridge, the release indication/usage data is preferably cryptographically signed by the apparatus whereby to enable the remote system to verify that the release indication comes from the apparatus.

With regard to how the cartridge check unit 14 operates to check whether an ink cartridge installed in the interface 12 is from the approved subset, particular implementation options include:

(i) The cartridge check arrangement 14 is arranged to issue a challenge to the cartridge 11 installed in the interface 12, this challenge including an element unpredictable by the cartridge. The cartridge stores the private key of an associated cryptographic public/private key pair, the public key being verifiable by the check unit 14 as one associated with a cartridge 11 that is a member of the approved subset of cartridges. The cartridge 11 installed in the interface 12 is arranged to respond to the challenge issued by the check unit 14 by using the private key to encrypt the element included in the challenge, the encrypted element then being returned to the check unit 14. The check unit 14 decrypts the encrypted element received from the cartridge using the public key expected or indicated by the cartridge 11 (after verifying that the public key is associated with a cartridge of the approved subset if this association is not already trusted). Only if the result of this decryption matches the original element included in the challenge, does the check unit 14 accept the consumable item as a member of the approved subset.

(ii) The cartridge check unit 14 is arranged to compare a subset code received from the ink cartridge 11 installed in the interface 12 with a code known to the check unit 14 of the printer, the subset code being a pseudo random number separately generated by a generator of the check unit 14 and a generator controlled by a source of cartridges of the approved subset, both generators being of the same form and being seeded with the same initial vector.

(iii) The cartridge check unit 14 is arranged to compare a subset code received from the ink cartridge 11 installed in the interface 12 with a code known to said in the apparatus, the subset code being a fixed code known to the check unit 14. Whilst this arrangement is not particularly secure, it is likely to be sufficient to prevent use of unapproved cartridges by normal users.

(iv) The cartridge check unit 14 comprises a part of the interface 12 arranged to either physically block the installation of ink cartridges that are not of the approved subset (because only such cartridges have the correct physical shape), or to detect the shape of a feature of an installed cartridge whereby to determine whether it is a member of the approved subset. Where the unit 14 comprises a part of the interface arranged to physically block installation of an unapproved cartridge, this part of the interface is arranged to be reconfigured when the apparatus enters its freed mode so as to allow installation of unapproved cartridges. It will be appreciated that relying on the physical shape of a cartridge to indicate whether it is a member of the approved subset is not very secure as the shape can be readily copied.

It may also be noted that by arranging for the apparatus to expect to read in a unique cartridge identifier from a cartridge 11 installed in the interface 12, it becomes possible to minimise the risk of an approved ink cartridge being refilled in an unauthorised manner to extend its life. More particularly, the apparatus, at least when in its first mode, is preferably arranged to read an identifier from the currently-installed cartridge, record usage of the cartridge against its identifier, and only use the cartridge with that identifier whilst its recorded usage is below an expected maximum usage for cartridges of the approved subset. If a cartridge does not have an identifier, it is not used. Again whilst this precaution is not fully secure, it is likely to be effective in many situations.

A first specific printer management method embodying the invention will now be described with reference to FIG. 2, this method using implementation option (a) above for generation of the release code and implementation option (ii) above for checking that an installed cartridge is a member of the approved set.

Figure 2:
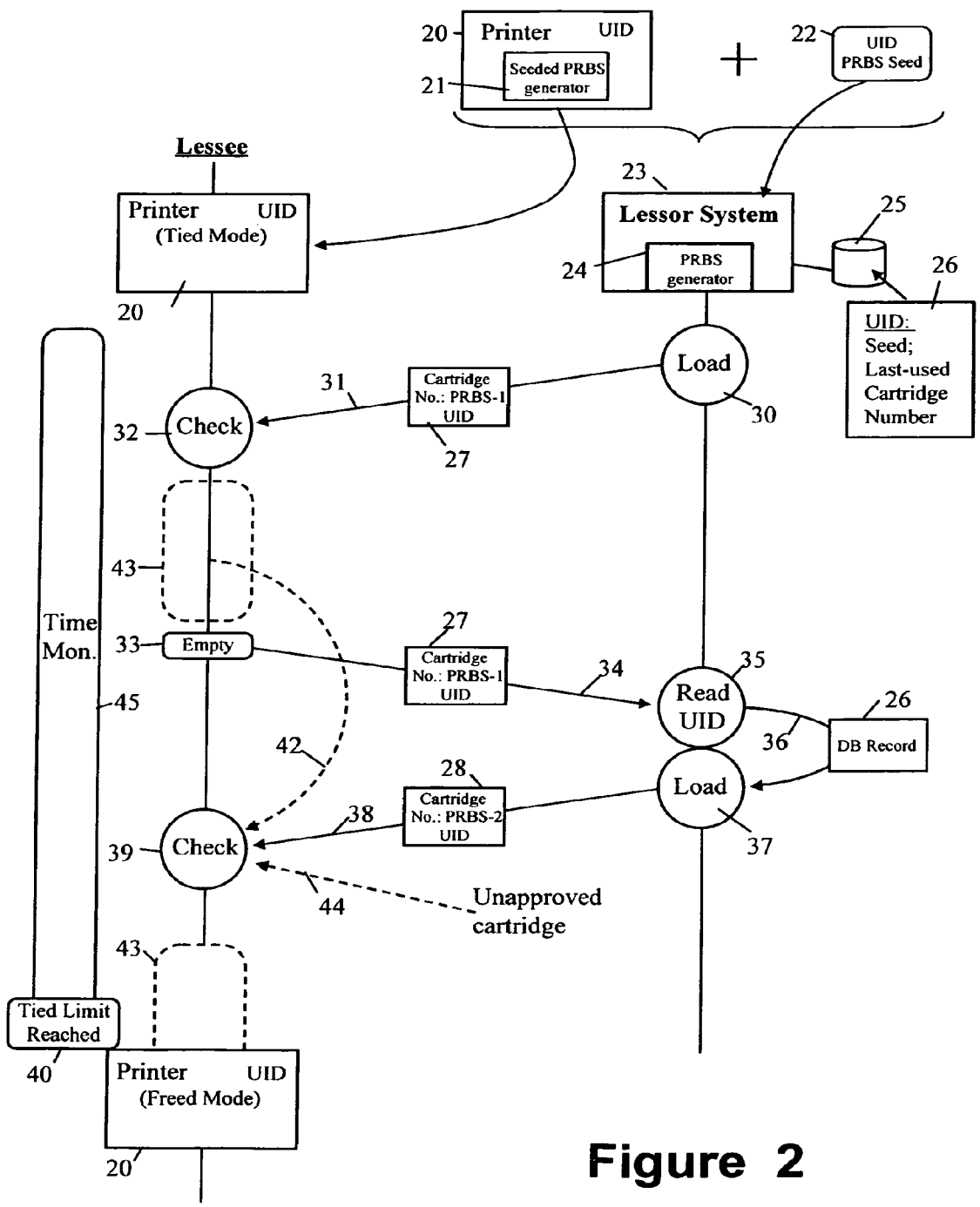
FIG. 2 is a diagram illustrating a first method according to the invention for managing a printer apparatus.

In the situation depicted in FIG. 2, a printer 20 is provided from a manufacturer to a lessor (a printer leasing organisation) and the lessor leases out the printer to a lessee for a predetermined period after which legal title to the printer passes from the lessor to the lessee and the relationship between the lessor and lessee terminates. During the lease period, the lessor requires the lessee only to use approved ink cartridges 27, 28 in the printer 20. This is achieved by the printer having a form corresponding to the printer 10 of FIG. 1 including the time monitor 19 (but not necessarily the usage monitor 15). The printer 20 resides in its tied mode when the lessee first takes possession and therefore only works with ink cartridges from the approved subset—in this case, cartridges 27, 28 supplied by the lessor. After a predetermined period corresponding to the lease period, the printer 20 sets itself into its freed mode in which it works with any ink cartridge of a type adapted for the printer regardless of the origin of the cartridge. A more detailed description of the FIG. 2 method is given below.

The printer 20 has an associated unique identity (UID). The cartridge check unit 14 of the printer includes a pseudo-random binary sequence (PRBS) generator 21 of predetermined configuration which is seeded with a seed vector specific to the printer 20; it is assumed that the PRBS generator 21 cannot be tampered with and that the seed vector cannot be discovered, at least not without great difficulty. The UID of the printer and the value of the seed vector are recorded in a smartcard 22 that is provided in a confidential manner to the lessor along with the printer 20. The lessor has a computer system 23 that includes a PRBS generator of the same type as PRBS generator 21, and an associated database 25. The lessor loads the data from the smartcard 22 into the computer system 23 which generates a corresponding record 26 in database 25 accessible by printer UID and storing the seed vector for the printer and, as will be seen, the number allocated to the last-issued ink cartridge.

When the lessor leases out the printer 20 to the lessee, the lessor performs several actions. More particularly, the lessor sets the printer 20 into its tied mode if not already in this mode and causes the time monitor 19 to record both the current date as the reference time and the duration of the lease period as the threshold time (advantageously, the control block 13 is arranged to require the input of the PRBS seed vector via a control interface of the printer in order to cause the reference and threshold times to be set whereby only the lessor can carry out this operation). The lessor system 23 is then used to program a memory chip of an approved ink cartridge 27 with random number PRBS-1 generated by the PRBS generator 21 by a one step advance from its initial state in which it is freshly seeded with the seed vector stored in the database record 26 for the UID of the printer to be leased. The UID of the printer is also stored in the cartridge 27. The loading of this data into the ink cartridge 27 is indicated by load operation 30 of FIG. 2.

The cartridge 27 is then provided to the lessee (see arrow 31) along with the printer 20.

Upon the lessee installing the ink cartridge 27 in the printer 20, the printer, being in its tied mode, causes its check unit 14 to check that the cartridge is an approved cartridge—see operation 32 of FIG. 2. The unit 14 does this by reading the cartridge number PRBS-1 and comparing it with the output of the printer's own PRBS generator 21 advanced one step from its seed state. If the numbers match the cartridge is accepted and used; if the numbers do not match the printer is inhibited from using the cartridge and an appropriate message is displayed on an output screen of the printer or sent by the printer to a connected computer for output on the computer's display.

If the cartridge 27 is accepted, the check unit 14 stores the cartridge number PRBS-1 in non-volatile memory as the number of the most-recently used cartridge.

The lessee then proceeds to use the printer in normal manner.

At least whilst the printer is turned on, the time monitor 19 checks whether the predetermined threshold time has been reached—see operation 45 in FIG. 2.

In the present case, before the threshold time is reached, the cartridge 27 is used up ("empty" 33). The lessee removes the cartridge 27 from the printer 20 and returns it to the lessor (arrow 34). The printer UID is read by the system 23 (operation 35) and this UID is used by the system to retrieve the corresponding record 26 from the database 25. The seed vector and last-issued cartridge number (in this case PRBS-1) are read from the record 26. Next, the PRBS generator 24 is seeded with the seed vector and advanced until its value matches the last-issued cartridge number; the PRBS generator is then advanced one more step and the resultant PRBS (here, PRBS-2) is taken and used as the cartridge number to be loaded into a new approved cartridge 28 along with the printer UID (operation 37).

The new cartridge 37 is then provided to the lessee who takes it (arrow 38) and installs it in the printer 20. Since the printer is still in its tied mode, the check unit 39 checks that the newly-installed cartridge 28 is an approved cartridge. This checking is similar to that performed in operation 32 except that a check is first made as to whether the number of the newly installed cartridge matches that of the stored most recently used cartridge number. Assuming this is not the case, the PRBS generator 21 is run from its initial seeded state until its output matches the stored most recently used cartridge number, and then advanced one step—the output value of the PRBS generator then indicates the expected next cartridge number. Provided this number from the PRBS generator 21 matches the number of the newly-installed cartridge, this latter cartridge is accepted as an approved cartridge and its number is stored in the printer as the most recently used cartridge; if there is no match, the newly-installed cartridge is not approved.

Where a newly-installed cartridge is found to have a cartridge number that matches the stored most recently used cartridge number, this can be a result of the cartridge simply having been temporarily removed and replaced (as indicated by dashed arrow 42 in FIG. 2). However, it could also be due to the cartridge having been subject to unauthorised refilling by the lessee. In order to prevent, or at least limit the effects of, such refilling, the printer 20 preferably includes usage monitor 15 set to track (see dashed operation 43) how much ink is being used. The amount of ink used (or remaining) is recorded in the printer against the cartridge number. When the amount of ink used from a particular cartridge reaches a limit corresponding to the expected maximum amount of ink in the cartridge, the printer is arranged to inhibit further use of the cartridge identified by the cartridge number concerned. In this manner, there ceases to be any benefit to the lessee in refilling a previously approved cartridge because the printer will not accept to use it (assuming that the approved cartridge was used until empty).

It will be appreciated that if an unapproved cartridge is installed in the printer 20 (see dashed arrow 44), it is highly unlikely that the cartridge will hold a number that will match the number expected by the check unit 14 so that the probability of the cartridge being accepted for use is correspondingly low. Even if a cartridge number is read from an approved cartridge and written to an unapproved cartridge, the above-described mechanism for restricting use of a cartridge identified by a particular cartridge number will result in no significant benefit being gained.

In due course, the printer's time monitor 19 will determine that the lease period has expired (box 40) and will provide a release code to the mode control unit 16 causing it to set the printer in its freed mode in which the check unit 14 no longer checks whether an installed cartridge is an approved cartridge.

Rather than the printer 20 switching to its freed mode after a predetermined time, the printer 20 can be arranged to switch to its freed mode after a predetermined usage threshold has been reached; in this case, the printer 20 includes the usage monitor 15 but not necessarily the time monitor 14.

Figure 3:
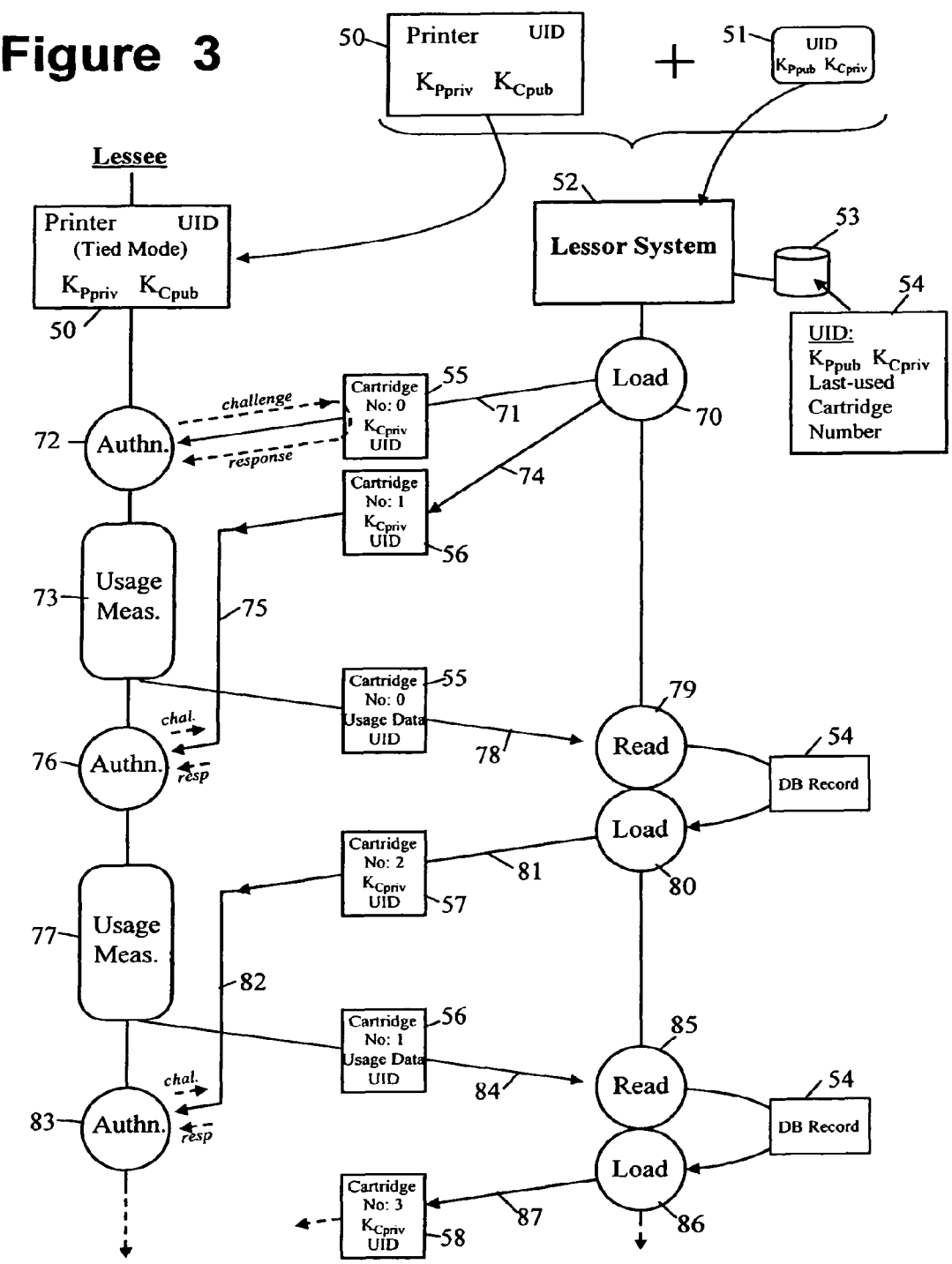
FIG. 3 is a diagram illustrating a first portion of a second method according to the invention for managing a printer apparatus.
Figure 4:
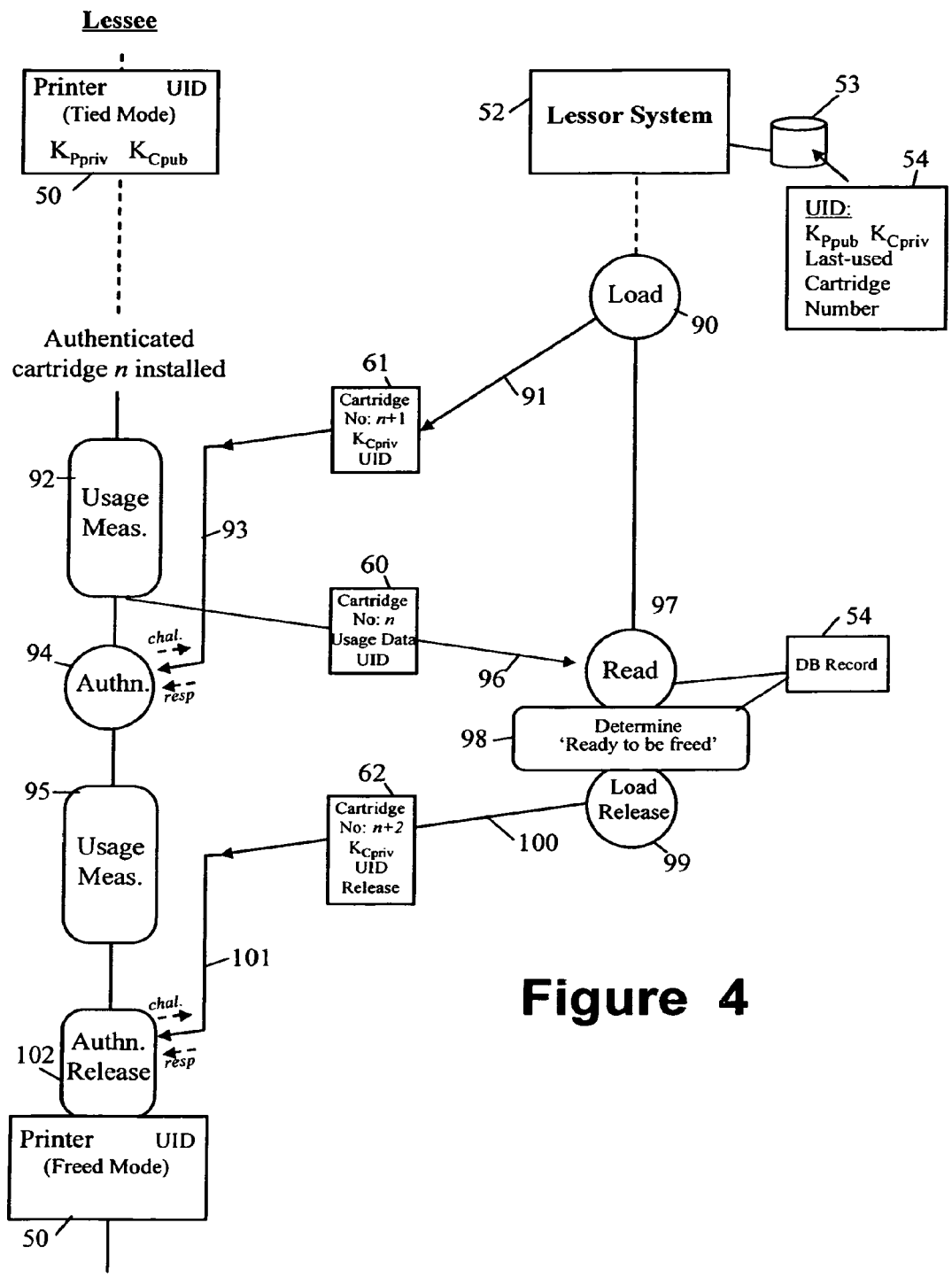
FIG. 4 is a diagram illustrating a second portion of the second method for managing a printer apparatus.

A second specific printer management method embodying the invention will now be described with reference to FIGS. 3 and 4 (FIG. 4 being a continuation of FIG. 3). This second method uses implementation option (d) above for generation of the release code and implementation option (i) above for checking that an installed cartridge is a member of the approved set.

In the situation depicted in FIGS. 3 and 4, a printer 50 is provided from a manufacturer to a lessor (a printer leasing organisation) and the lessor leases out the printer to a lessee for a predetermined usage amount after which legal title to the printer passes from the lessor to the lessee and the relationship between the lessor and lessee terminates. During the lease period, the lessor requires the lessee only to use approved ink cartridges 55-58, and 60-62 in the printer 50. This is achieved by the printer having a form corresponding to the printer 10 of FIG. 1 including the usage monitor 15 (but not necessarily the time monitor 19). The printer 50 resides in its tied mode when the lessee first takes possession and therefore only works with ink cartridges from the approved subset—in this case, cartridges 55-58, and 60-62 supplied by the lessor. Whilst in its tied mode, the printer 50 monitors its usage and stores usage data to the currently installed ink cartridge. This usage data is then transferred to the lessor in spent cartridges returned for replacement. The lessor uses this usage data to determine when the aforesaid predetermined usage amount has been reached, the lessor thereupon causing a release code to be passed to the printer (in the present case, in a new cartridge) resulting in the printer 50 being set into its freed mode in which it works with any ink cartridge of a type adapted for the printer regardless of the origin of the cartridge. A more detailed description of the method of FIGS. 3 and 4 is given below.

The printer 50 has an associated unique identity (UID). The printer also has an associated public/private key pair, the private key ($K_{Ppriv}$) of this key pair being stored in secure non-volatile memory of the printer 50. The public key ($K_{Cpub}$) of a cartridge public/private key pair is also stored in non-volatile memory of the printer 50. The UID of the printer, the public key $K_{Ppub}$ of the printer key pair, and the private key $K_{Cpriv}$ of the cartridge key pair are recorded in a smartcard 51 that is provided confidentially to the lessor along with the printer 50. Whilst the printer key pair is specific to the printer 50, the same cartridge key pair can be used with multiple printers provided these printers, and thus the smartcards 51, are all provided to the same party or to a group of parties who can all be trusted to keep the cartridge private key confidential.

The lessor has a computer system 52 with associated database 53. The lessor loads the data from the smartcard 51 into the computer system 52 which generates a corresponding record 54 in database 53 accessible by printer UID and storing the printer public key $K_{Ppub}$, the cartridge private key $K_{Cpriv}$, and the number allocated to the last issued ink cartridge (in the present embodiment these numbers are issued consecutively starting from 0).

When the lessor leases out the printer 50 to the lessee, the lessor performs several actions. More particularly, the lessor sets the printer 50 into its tied mode if not already in this mode. The lessor system 52 is then used to program an integrated circuit chip of an approved ink cartridge 55 with a cartridge serial number of 0, the cartridge private key $K_{Cpriv}$, and the UID of the printer 50. It is assumed that this chip is such that the cartridge private key cannot be read, or otherwise discovered from the chip, at least not without considerable difficulty. The chip also includes functionality for responding to an authentication challenge by encrypting an element in the challenge using the cartridge private key, and returning the encrypted element. The loading of data into the ink cartridge 55 is indicated by load operation 30 of FIG. 2. In fact, the load operation 70 also involves initializing a second cartridge 56 by programming it with a cartridge serial number of 1, the cartridge private key $K_{Cpriv}$, and the UID of the printer 50.

The cartridges 55 and 56 are then provided to the lessee (see arrows 71 and 74) along with the printer 50.

Upon the lessee installing the first ink cartridge 55 in the printer 50, the printer, being in its tied mode, causes its check unit 14 to check that the cartridge is an approved cartridge—see operation 72 of FIG. 3. This check is effected as follows:
  the unit 14 generates a random element which it passes to the cartridge 55 in a challenge message;
  the cartridge encrypts the received element using the cartridge private key $K_{Cpriv}$ and returns the encrypted element to the unit 14;
  the unit 14 decrypts the encrypted element using the cartridge public key $K_{Cpub}$ and compares the result with the element included in the initial challenge—if there is a match, the unit 14 knows that the cartridge has been loaded with a valid cartridge private key and therefore accepts the cartridge as an approved cartridge. If no match is found when comparing the decryption result with the initial challenge element, the printer is inhibited from using the cartridge and an appropriate message is displayed on an output screen of the printer.

Assuming that the cartridge 55 is accepted, the lessee can now proceed to use the printer 50 in normal manner.

Whenever the printer is used, the usage monitor 15 monitors the usage made (operation 73) and records this usage both in a non-volatile memory of the printer and in the chip of the currently-installed ink cartridge. Preferably, the usage data loaded into the cartridge spans the whole period of use from when the first cartridge 55 was installed; alternatively, only usage data relevant to the current cartridge is transferred to the cartridge. The loading of usage data to the cartridge is done on a regular basis so that whenever the ink cartridge is removed it contains substantially up-to-date usage data; alternatively, the printer can be arranged such that to remove the ink cartridge it must be moved to a special position, the cartridge being moved to this position in response to a corresponding user input that also triggers the loading of current usage data from the printer to the cartridge.

In due course, the first ink cartridge 55 is used up and is replaced (see arrow 75) by the second cartridge 56 (with serial number 1). The check unit 14 performs the same authentication process as with the first cartridge (see operation 76) to confirm that the second cartridge 56 is an approved cartridge. Assuming that cartridge 56 is found acceptable, the lessee can then continue using the printer 50, such use being monitored as before by the usage monitor 15 (operation 77).

When convenient, the lessee returns the first spent cartridge 55 to the lessor (arrow 78). The data stored in the returned cartridge is read by the system 52 (operation 79) with the read-in UID being used to call up the relevant record 54 from database 53; the usage data read from the cartridge is stored to this record and may also be used to create a billing invoice for sending to the lessee.

Preferably, the usage data stored by the printer 50 to a cartridge is digitally signed using the private key $K_{Ppriv}$ of the printer 50. This enables the lessor system 52 to verify, using the public key $K_{Ppub}$ of the printer 50, that the usage data read in operation 79 was indeed written by the printer identified by the UID in the cartridge.

Once the usage data is read from the spent cartridge 55, a new approved cartridge 57 is loaded with data (operation 80) by the system 52. The data loaded comprises the printer UID, the cartridge private key $K_{Cpriv}$ (the same for all approved cartridges to be used with this printer 50), and the next cartridge serial number as judged relative to the last-issued number held in the record 54 (this number being updated accordingly)—in the present case, the serial number is 2. The lessee takes away the new cartridge (see arrow 81) and stores it for future use.

Thus, when the second cartridge 56 runs out of ink, the lessee can immediately replace it with the new cartridge 57 (see arrow 82), the new cartridge being authenticated upon installation (operation 83) in the manner already described above. The spent second cartridge 56 is in due course returned to the lessor (arrow 84) where its stored usage data is read and recorded (operation 85) before a fourth new cartridge 58 (serial number 3) is loaded with data (operation 86) and taken away by the lessee (arrow 87).

The above-described process of replenishing spent cartridges with new approved cartridges continues until the predetermined usage threshold is reached. This stage is illustrated in FIG. 4 where the currently-installed cartridge 60 has a serial number n and a new approved cartridge 61 with serial number n+1 has been loaded by the lessor system 52 in operation 90 and is now held by the lessee, ready to be installed.

The predetermined usage threshold is crossed whilst the cartridge 60 is installed but the printer 50 is not set up to recognise this (or, at least, is not set up to take any action other than, possibly, to inform the lessee via an output display message). The cartridge 60 is in due time replaced by the cartridge 61 (see arrow 93) which is duly subject to authentication (operation 94); use of this cartridge is then monitored as with the preceding cartridges.

Meanwhile, the cartridge 60 is returned to the lessor. The system 52, upon reading the usage data in the cartridge and retrieving the relevant record 54 (operation 97), determines in operation 98 that the total usage of the printer has now exceeded the predetermined usage threshold (stored in the record 54 if not a fixed standard threshold). The system 52 records this fact in the record 54 and generates a final invoice. Finally, the system 52 encrypts a release code using the public key $K_{Ppub}$ of the printer 50 and stores the encrypted release code in a new cartridge 62 that is also loaded in usual manner with its serial number (here, n+2), the cartridge private key $K_{Cpriv}$, and the printer UID.

When the cartridge 62 is installed in the printer 50, it is authenticated as usual (operation 102). However, a final step of the authentication process (carried out every time a cartridge check is effected by the check unit 14) detects the presence of the encrypted release code. The encrypted release code is read out by the printer's mode control unit 16 and decrypted using the private key $K_{Ppriv}$ of the printer. If the result is a correct release code, the mode control unit 16 sets the printer into its freed mode in which the check unit 14 no longer checks whether an installed cartridge is an approved cartridge. Encrypting the release code with the public key of the printer 50 ensures that only the printer can read the code.

If the printer were arranged to check for the presence of an encrypted release code in a newly installed cartridge regardless of whether or not the cartridge authenticated, then any cartridge could be used to transfer the release code from the lessor system 52 to the printer 50.

As with the first method discussed above with respect to FIG. 2, the printer 50 can be arranged to guard against the lessee refilling a spent approved cartridge by recording against the serial number of each cartridge the amount of use made of the cartridge. The printer 50 then ceases to use a cartridge with a particular serial number once the use recorded against that number reaches a predetermined maximum cartridge use level.

To accommodate possible out-of-order cartridge installation in the embodiment of FIGS. 3 and 4, the printer can be arranged to look for a serial number one below and one above the serial number of the last-used cartridge.

It will be appreciated that many variants are possible to the above described embodiments of the invention. Thus, for embodiments in which a remote system passes a release code to the apparatus with tied and freed modes, the release code can take the form of a secret specific to the apparatus concerned and initially known only to the apparatus and the remote system; in this case, it is not necessary to encrypt the release code because at the time it is made public release of the apparatus into its freed mode is permitted and the code is not effective to release any other apparatus.

Approved cartridges need not be limited to cartridges provided by the lessor as in the above-described embodiments. For example, a printer when in its restricted mode could be required to use only cartridges supplied by a particular cartridge manufacturer; in this case, each cartridge can be loaded by the cartridge manufacturer both with a cartridge-specific private key and with a copy of the corresponding public key certified by the cartridge manufacturer using the manufacture's private key—the printer (which is loaded with the cartridge manufacture's public key) can check the cartridge public-key certificate and then carry out a challenge/response authentication of the cartridge in a manner similar to that described above with reference to FIG. 3.

It will also be appreciated that the present invention is not restricted to the specific circumstances of the lessor/lessee relationship used above by way of illustration.

Using spent cartridges to convey usage information back to an interested party can be effected regardless of whether this data is used by that party to judge when a usage threshold has been reached and, indeed, can be effected whether or not the printer concerned has the two operating modes, tied and freed, described above.

The invention claimed is:

1. A method of managing an apparatus that uses a consumable item of given type, the method comprising:
   setting the apparatus to operate in a first mode in which the apparatus is restricted to only being able to work with a subset of consumable items of said given type; and
   determining when the apparatus has reached a predetermined time or usage threshold for being in the first mode, and thereupon causing the apparatus to be set to operate in a second mode in which the apparatus is not restricted to working with consumable items of said subset.

2. A method according to claim 1, wherein the apparatus determines when said predetermined time or usage threshold has been reached and thereupon sets itself to operate in said second mode.

3. A method according to claim 1, wherein:
   a remote system responsible for the apparatus being in said first mode at a specific point in time, monitors elapsed time from said specific point in time and upon determining that said elapsed time has reached a predetermined time threshold, stores a release code to a consumable item; and
   the consumable item in which the release code is stored, is subsequently installed for use with said apparatus, and the apparatus upon determining that said release code is stored in this consumable item, sets itself to operate in its second mode.

4. A method according to claim 1, wherein the apparatus, when in said first mode, only works with a said consumable item that the apparatus has authenticated by a challenge/response exchange in which the apparatus issues a challenge including an element unpredictable by the consumable item, and the consumable item responds by encrypting said element with a private key, the apparatus using a public key known to be associated with said subset to decrypt the encrypted element in the response and only accepting the consumable item as a member of said subset if the result of this decryption corresponds to the element included in said challenge.

5. A method according to claim 1, wherein the apparatus, when in said first mode, only works with a said consumable item that it has authenticated by comparing a subset code received from the consumable item with a predetermined code known to said apparatus.

6. A method according to claim 5, wherein said subset code is a pseudo-random number the value of which is changed each time a said consumable item is installed to work with the apparatus.

7. A method according to claim 1, further comprising the apparatus when in said first mode:
   reading an identifier that is stored in a currently installed consumable item and that is intended to uniquely identify that particular consumable item,
   recording usage of the currently installed consumable item against said identifier; and
   only using a consumable item while the usage recorded against said identifier is below an expected maximum usage for consumable items of said subset.

8. A method according to claim 7, wherein the consumable comprises a cartridge, and the expected maximum usage indicates an expected maximum amount of ink in the cartridge.

9. An apparatus comprising:
   an interface for receiving a given type of consumable item; and
   a control arrangement for controlling apparatus operation and comprising:
      a check arrangement for checking whether a consumable item of said given type that is received by said interface is of a particular subset of consumable items of said given type; and
      a mode control unit arranged to respond to a release code to change apparatus operation from a first mode in which the apparatus is only able to work with consumable items that the check arrangement has found to be of said particular subset, to a second mode in which the apparatus is not restricted to working with consumable items of said particular subset.

10. An apparatus according to claim 9, wherein the mode control unit is arranged to determine via said interface whether a said consumable item received by the interface stores said release code and to respond accordingly.

11. An apparatus according to claim 10, wherein the mode control unit is arranged to subject data read from a said consumable item to decryption using a private key specific to the apparatus whereby to determine whether the consumable item stores said release code.

12. An apparatus according to claim 9, wherein said release code is specific to said apparatus whereby the release code is operative to cause only that apparatus to be set into said second mode.

13. An apparatus according to claim 9, wherein the control arrangement further comprises a usage monitor arranged to monitor usage of the apparatus in said first mode and to provide said release code to the mode control unit upon usage of the apparatus in said first mode reaching a predetermined usage.

14. An apparatus according to claim 9, wherein the control arrangement is arranged to determine when a predetermined time threshold has been reached for the apparatus being in said first mode and to thereupon provide said release code to the mode control unit.

15. An apparatus according to claim 9, wherein the check arrangement is arranged to check whether said consumable item is of said subset by issuing a challenge including an element unpredictable by the consumable item, receiving back a response including a further element, decrypting the further element using a public key associated with consumable items of said subset, and only accepting the consumable item as a member of said subset if the result of this decryption corresponds to the element included in said challenge.

16. An apparatus according to claim 9, wherein the check arrangement is arranged to check whether said consumable item is of said subset by comparing a subset code received from the consumable item with a predetermined code known to said apparatus.

17. An apparatus according to claim 16, wherein said subset code is a pseudo-random number the value of which is changed each time a said consumable item is received by said interface.

18. An apparatus according to claim 9, wherein the control arrangement further comprises:
   a first arrangement for reading an identifier that is stored in a consumable item currently received by said interface and that is intended to uniquely identify that particular consumable item,
   a second arrangement for recording usage of a said consumable item against its identifier; and
   a third arrangement arranged to enable use of a consumable item only while usage recorded against its identifier is below an expected maximum usage for consumable items of said subset.

19. An apparatus according to claim 18, wherein the consumable comprises a cartridge, and the expected maximum usage indicates an expected maximum amount of ink in the cartridge.

* * * * *

UNITED STATES PATENT AND TRADEMARK OFFICE
CERTIFICATE OF CORRECTION

Page 1 of 1

PATENT NO.         : 8,814,450 B2
APPLICATION NO.    : 13/277119
DATED              : August 26, 2014
INVENTOR(S)        : Michael Yearworth et al.

It is certified that error appears in the above-identified patent and that said Letters Patent is hereby corrected as shown below:

In the Claims

In column 12, line 49, in Claim 3, delete "its" and insert -- said --, therefor.

In column 12, line 52, in Claim 4, delete "a said" and insert -- said --, therefor.

In column 12, line 65, in Claim 5, delete "it" and insert -- the apparatus --, therefor.

Signed and Sealed this
Thirteenth Day of January, 2015

Michelle K. Lee
*Deputy Director of the United States Patent and Trademark Office*